(No Model.) 2 Sheets—Sheet 1.
H. W. WALKER & T. L. PATTERSON.
APPARATUS FOR MOLDING AND REFINING SUGAR.
No. 401,612. Patented Apr. 16, 1889.
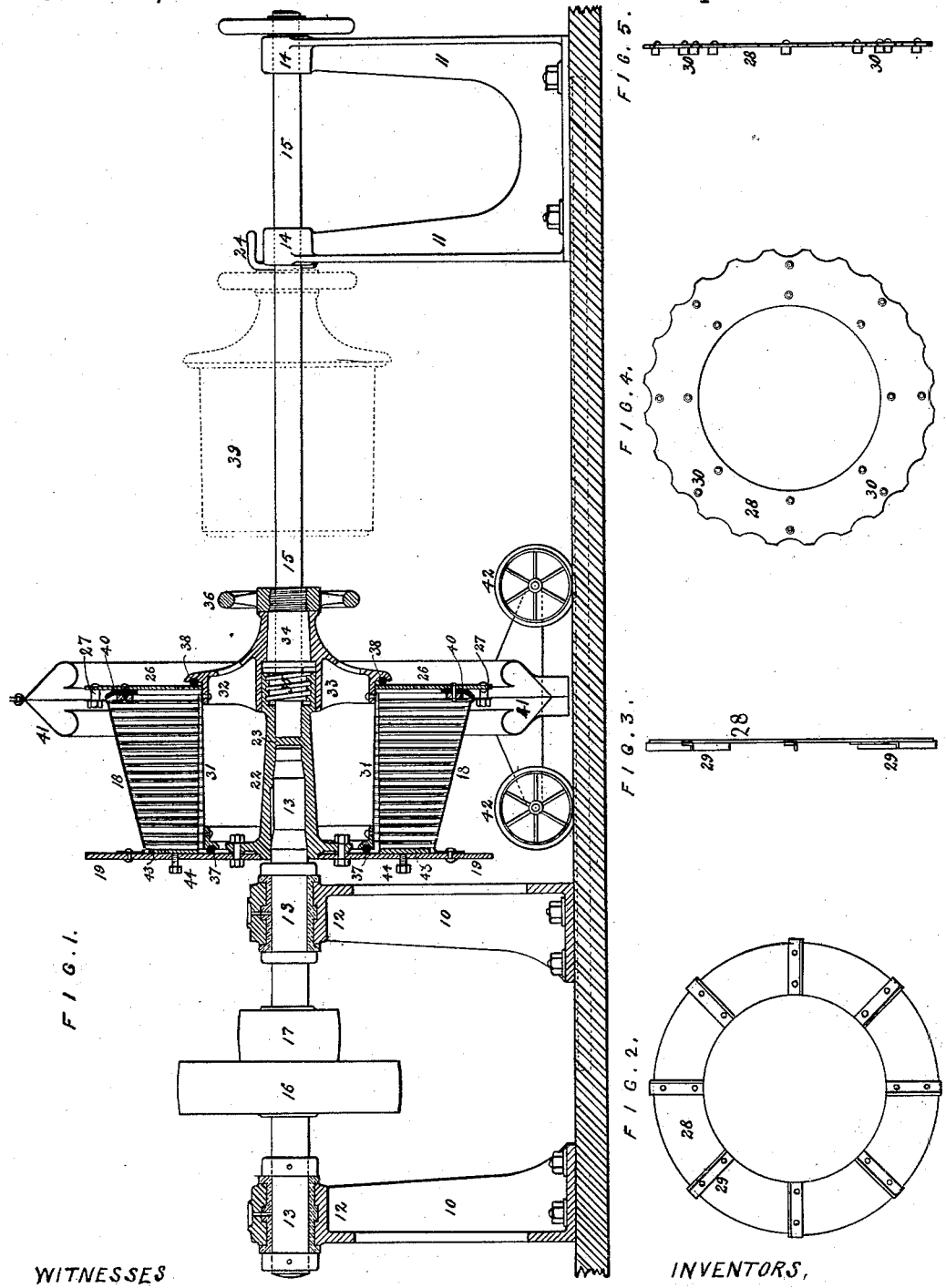
WITNESSES
Rufus H. Skeel
Wm Chester Wells
INVENTORS,
H. W. Walker and T. L. Patterson
by their Attorneys
Howson and Howson

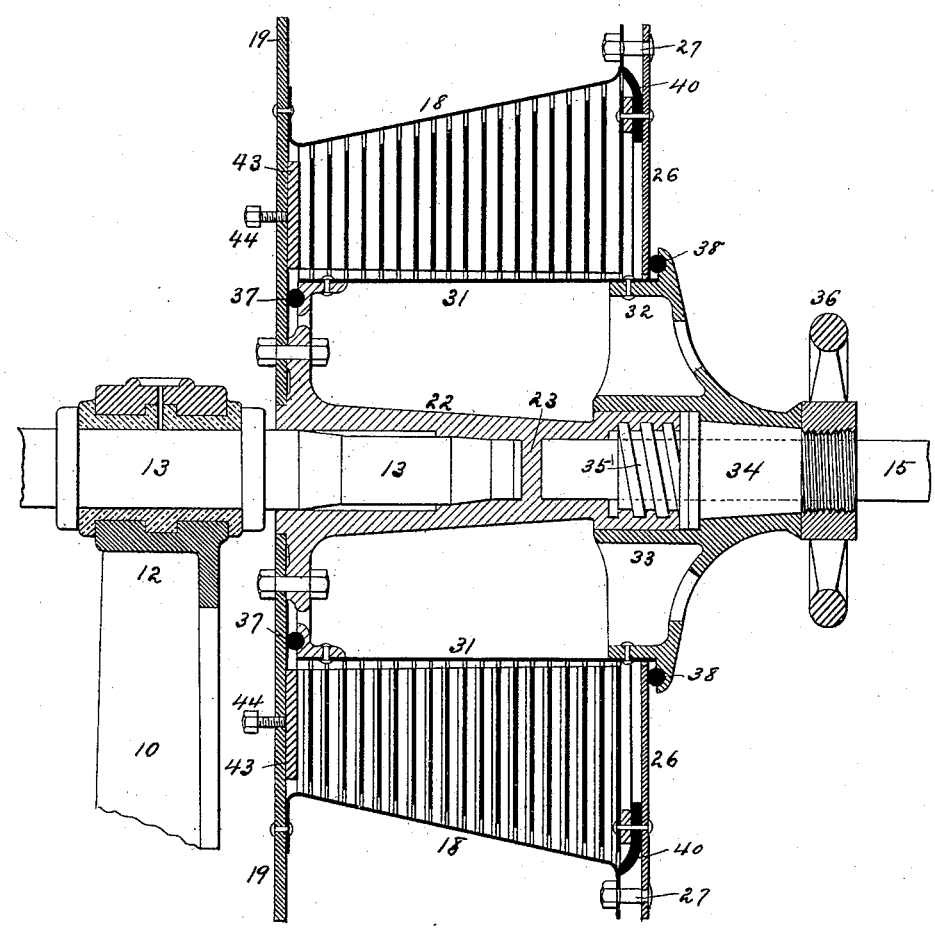

United States Patent Office.

HUGH WILLIAM WALKER AND THOMAS LAW PATTERSON, OF GREENOCK, COUNTY OF RENFREW, SCOTLAND.

APPARATUS FOR MOLDING AND REFINING SUGAR.

SPECIFICATION forming part of Letters Patent No. 401,612, dated April 16, 1889.

Application filed February 4, 1888. Serial No. 263,011. (No model.) Patented in England March 24, 1887, No. 4,397; in France December 31, 1887, No. 187,910; in Belgium December 31, 1887, No. 80,143; in Germany January 9, 1888, No. 44,747; in Canada March 1, 1888, No. 28,565, and in Austria-Hungary May 13, 1888, No. 3,062 and No. 13,025.

*To all whom it may concern:*

Be it known that we, HUGH WILLIAM WALKER and THOMAS LAW PATTERSON, subjects of the Queen of Great Britain and Ireland, and residents of Greenock, in the county of Renfrew, Scotland, have invented certain Improvements in Apparatus for Molding and Refining Sugar, (for which patents have been granted in Great Britain, No. 4,397, March 24, 1887; France, No. 187,910, December 31, 1887; Belgium, No. 80,143, December 31, 1887; Germany, No. 44,747, January 9, 1888; Canada, No. 28,565, March 1, 1888; Austria-Hungary, No. 3,062 and No. 13,025, May 13, 1888,) of which the following is a specification.

This invention has for its object to improve the construction and operation of apparatus for molding and refining sugar, the improved apparatus being designed for making cakes or blocks of sugar of "loaf-sugar" quality and suitable for being divided into cubes or for being broken into lumps, and for doing so more satisfactorily than heretofore and with less manual labor than has hitherto been required.

In carrying out the invention a mold of a truncated conical form is employed, and a series of flat annular plates are placed in it and retained by a removable cover. The sugar, in a condition like what is known as "masse-cuite," is led into the mold while the mold is rotating at a moderate velocity, and the rotation causes the sugar to be filled in a uniform manner into the spaces between the annular plates, and so as with the plates to form a truncated annular or hollow cone. When the sugar has been thus filled in, a tapered or slightly-coned inner shell is moved in to close the inner ends of the spaces between the plates. When the inner shell has been fixed in position the mold is removed from its shaft and placed with its axis vertical, in order that the sugar may set and crystallize, and when a filled mold has rested long enough it is again fixed on the mold-shaft for the refining operations. The inner shell is then removed and the mold is made to rotate at a sufficient velocity for carrying off the green sirup from the interstices of the sugar. The outer conical shell of the mold is not perforated to permit the sirup to pass through, as in an ordinary centrifugal machine; but an outlet is provided for it at the outer end— that is, at the largest part of the conical shell. When the sugar is being drained, the sirup in each space between the annular plates first passes radially to the shell of the mold, and then, in consequence of the conical form of the shell, which form is given for the purpose, flows along the shell to its larger end and passes out at the outlet provided at that part into any suitable receptacle. When the green sirup has been thrown off, the operation of liquoring is applied, and an important practical advantage of the improved apparatus consists in its admitting of this operation being effected more satisfactorily and with less waste than in existing apparatus for the same purpose. The saturated solution of pure sugar used for liquoring may be applied in various ways. Thus it may be poured into the mold while the mold rotates at full speed, or it may be supplied in separate successive charges, the mold rotating at a moderate speed while receiving each charge and being subsequently driven at full speed. The liquoring application may be repeated as often as may be necessary. Finally, the mold is driven at full speed during a time sufficient for completely draining the sugar, and then the mold is taken off the shaft, the annular cover is removed, and the mold is turned bottom upward to empty the sugar and annular plates. The cakes or blocks can then be easily separated from the annular plates and can be dried in the usual manner. The mold may be fixed on a vertical shaft for the liquoring and draining operations and it may also be fixed on a vertical shaft while being filled; but we prefer the horizontal shaft for the filling operation.

In order that our said invention and the manner of using the same may be properly understood, we hereunto append two sheets of explanatory drawings, to be hereinafter referred to, and in which are represented sugar molding and refining apparatus embodying our improvements.

Figure 1 of the accompanying drawings is a sectional side elevation. Figs. 2 and 3 are a face and an edge view, respectively, of one modification of one of the flat annular plates; and Figs. 4 and 5 are a face and an edge view, respectively, of another modification of one of the plates. Fig. 6 is a sectional side elevation of the mold and its parts drawn to a larger scale.

The apparatus comprises two pairs of standards, 10 11, one pair, 10, being fitted with bearings 12 for a rotating horizontal shaft, 13, and the other pair, 11, carrying in guide-eyes 14 a non-rotating shaft, 15, which is in line with the rotating shaft 13. The rotating shaft 13 has fixed on it pulleys 16 17, of different sizes, to receive a driving-belt for driving it at one or other of two speeds, as required; or the shaft may receive its motion from a counter-shaft provided with pulleys or gear for obtaining different speeds. One end of the rotating shaft 13 projects or overhangs from its bearings 12 to receive the mold 18, which is of a truncated conical form, with its smaller end nearest the standard 10. The conical shell 18 may be made of one or more plates of sheet-steel or malleable iron suitably bent and welded or riveted together. The bottom of the conical shell 18 is flanged and riveted to a flat bottom plate, 19. At the center of the bottom plate, 19, there is fixed a hollow boss, 22, which projects inside of the mold, and which has a part of its length bored or shaped internally to fit upon the end of the rotating shaft 13, which has on it a feather engaging in a groove in the boss, so that the mold may be driven or made to rotate by the shaft. The part of the boss 22 extending beyond the end of the rotating shaft 13 is bored to receive the end of the non-rotating shaft 15. A diaphragm, 23, is formed in the boss for the end of the non-rotating shaft 15 to bear against, or the boss may be first bored completely through, and the diaphragm 23 may be subsequently fixed in it. The non-rotating shaft 15 can be moved endwise in its guide-eyes 14, so that it can be withdrawn to allow the mold 18 to be removed, and when this shaft 15 is placed as shown in Fig. 1, for the purpose of keeping the mold on the rotating shaft 13, it is fixed by a hand-key, 24, which then prevents it from rotating by fitting partly in a groove in the face of the standard 11.

The wider edge of the conical mold-shell 18 is flanged and has attached to it a removable annular cover, 26, the attachment being, by preference, made by means of shouldered studs 27, riveted to the annular cover and made with screw-threaded projecting pins, which pass through holes in the flanged part of the shell 18 and receive nuts on the other side thereof. The studs 27 keep the annular cover 26 at a little distance from the edge of the mold-shell 18, for a purpose hereinafter explained.

For the purpose of molding the sugar into plates a number of annular plates, 28, of steel or other suitable metal, are provided, such plates being made with equal central openings, but of graduated sizes as regards their outer circumferences, so that when arranged together in order they present a general external contour of a conical form corresponding to that of the mold-shell 18. The annular plates 28 are kept at equal distances apart, so as to form cakes of uniform thickness, this being done by angled ribs 29, fixed to the plates in radial positions, as shown in Figs. 2 and 3, or by studs 30, riveted to the plates, as shown in Figs. 4 and 5. When the ribs 29 are used, they are made to project slightly beyond the outer edges of the annular plates to allow the sirup to pass between the edges of the annular plates and the inside of the mold-shell 18, and when studs 30 are used the edges of the annular plates 28 are notched for the same purpose, as shown in Fig. 4. The annular plates 28 are shown in position in the mold 18 in Fig. 1, the thick lines representing the plates as in section, and the other lines indicating the distance-ribs 29. In Fig. 1 there is also shown as in position an inner shell, 31, which can be entered and withdrawn through the central opening in the annular cover 26. This inner shell, 31, is made of a nearly-cylindrical or slightly-tapered form and of sheet-steel or other suitable metal, and is fixed to an end or cover, 32, formed with a boss, 33, which fits on the outside of the end of the boss 22, fixed to the bottom plate, 19, of the mold. Within the boss 33 of the cover there is fitted a bushing, 34, fitted to slide on the non-rotating shaft 15, and formed with an external screw-thread, 35, to screw into an internal screw-thread formed inside of the end of the boss 22, fixed to the bottom plate, 19. A hand-wheel, 36, is fixed on the bushing 34 for manipulating it when coupling it to or uncoupling it from the boss 22. The coupling can be effected without appreciable labor when the shaft 13 is suitably rotating by moving the cover 32 inward until the screw-thread 35 engages, whereupon the rotation will cause the cover to be drawn in by the screwing action, any convenient frictional appliance being used to retard the rotation of the bushing 34, if required. When the inner shell, 31, with its cover 32, is fixed in position, a fluid-tight joint is made between its inner end and the bottom plate, 19, by means of a rubber ring, 37, set in a grooved ring fixed to the inner shell, 31, the rubber ring 37 coming in contact with the bottom plate, 19. At the same time a fluid-tight joint is obtained between the cover 32 of the inner shell, 31, and the annular cover-plate 26 by a rubber ring, 38, set in a groove formed for it in the cover 32, coming in contact with the outside of the cover-plate 26.

When a fresh charge of sugar (in the condition of masse-cuite) is to be introduced into the mold 18, the inner shell, 31, with its cover 32, being uncoupled and in the position in which it is indicated by dotted lines 39 in Fig. 1, but the annular plates 28 being in their places, the mold is made to rotate at a moderate rate—say seventy to eighty turns per minute—and the sugar is led into the mold by means of a chute moved in a manner to distribute it uniformly. The rotation causes the sugar to be filled in a uniform manner into the spaces between the annular plates 28, and so as with those plates to form a truncated annular or hollow cone. At this time the sugar is prevented from escaping between the annular cover-plate 26 and the edge of the mold-shell 18 by a ring or annular lip of rubber, 40, which is fixed to the inside of the annular cover-plate by means of a metal ring, and which is formed of the section shown in Fig. 1, so as to press against the edge of the mold-shell 18. This rubber ring 40 is stiff enough to resist the centrifugal force imparted to the sugar or sirup by the moderate rotation used when filling in the sugar; but it yields and opens to let out the sirup when at a subsequent stage the much higher rate of rotation usually adopted for draining sugar is employed. After filling in the sugar, the inner shell, 31, with its cover, 32, is moved inward and coupled to the boss 22, and then the non-rotating shaft 15 is withdrawn and the mold is removed and dealt with as hereinbefore explained. It may here be mentioned that the bottom plate, 19, of the mold is made of the same diameter as the plate 26 at the wider end of the conical shell 18, so that the mold can be easily and conveniently moved from place to place by rolling it along with its axis horizontal.

Instead of using the rubber ring or annular lip 40, as hereinbefore described, any other convenient provision may be made for giving egress to the sirup when liquoring or draining the sugar. Thus the annular cover 26 may be attached by means of screw-bolts arranged so that it can be made close at one time and sufficiently open at another time, as required; or, when the rubber ring 40 is used, the annular cover 26 may have its distance from the mold-shell 18 determined by a perforated ring or any other convenient distance piece or pieces which will allow the sirup to pass out when the rubber ring opens. While sugar is being filled into the mold there is placed around the wider part of the mold an annular receptacle, 41, mounted on wheels 42, for the purpose of catching any sirup that may leak and be thrown off from the mold. When, however, we apply the high speed for the purpose of draining the sugar, we prefer to have the mold placed within a strong casing—such as is used with ordinary centrifugal machines employed in the sugar-manufacture. When, after the final draining of the sugar, the mold 18, with the annular cover 26 removed, is turned bottom upward for the purpose of emptying the annular plates 28 and the cakes of sugar formed between them, these will easily separate from the mold if the inclination of the conical shell to the axis is sufficient; but in case the inclination should prove to be insufficient, or there is difficulty from any other cause in emptying the mold, we provide a movable ring, 43, in the bottom of the mold, and, if required, press it against the mass of sugar and annular plates 28 by means of screws 44, so as to start it and detach it from the mold, whereupon the mold can be easily lifted off.

In working with our improved apparatus the flat annular plates 28, for dividing the sugar into cakes, may be omitted, if desired, and in that case the sugar will be formed into one annular block, its treatment otherwise remaining the same. A block made in this way may be broken or sawed up, as required, either before or after being dried.

What we claim as our invention is—

1. Apparatus for molding and refining sugar, comprising, in combination, a driving-shaft, a mold in the form of a truncated cone and carried by the shaft, with an imperforate circumferential shell, an annular cover which is carried by the shell and through the center of which the mold can be charged, the mold having a circumferential outlet closed when charging and open when draining or drying, and a central cover and inner shell, substantially as set forth.

2. The combination of a rotary mold having an imperforate shell with a number of flat annular plates at right angles to the axis of the mold and having distance projections to keep them apart, and having passages between their outer edges and the inner face of the shell for the escape of the sirup, substantially as set forth.

3. The combination of a rotary sugar-mold having an imperforate circumferential shell and dividing-plates, leaving spaces between the edges of the plates and the shell, with an annular cover having an outlet between it and the edge of the shell and a valve in the said outlet, substantially as herein set forth.

4. A rotary sugar-mold having an imperforate shell and cover, leaving an outlet-space between them, and a valve composed of an annular lip of rubber between the shell and cover to allow the escape of liquid when the machine is in operation, substantially as set forth.

In testimony whereof we have signed our names to this specification in the presence of two subscribing witnesses.

HUGH WILLIAM WALKER.
THOMAS LAW PATTERSON.

Witnesses:
 EDMUND HUNT,
 DAVID FERGUSON.